United States Patent [19]

Cleary

[11] 4,424,338

[45] Jan. 3, 1984

[54] POLYMER TREATMENT

[75] Inventor: James W. Cleary, Bartlesville, Okla.

[73] Assignee: Phillips Petroleum Company, Bartlesville, Okla.

[21] Appl. No.: 416,755

[22] Filed: Sep. 10, 1982

[51] Int. Cl.[3] .............................................. C08G 75/14
[52] U.S. Cl. .................................... 528/388; 525/537
[58] Field of Search ......................... 525/537; 528/388

[56] References Cited

U.S. PATENT DOCUMENTS

| | | | |
|---|---|---|---|
| 3,948,865 | 4/1976 | Brady et al. | 260/79 |
| 4,251,575 | 2/1981 | Brady et al. | 528/486 |

*Primary Examiner*—Melvyn I. Marquis

[57] ABSTRACT

Arylene sulfide polymers such as polyphenylene sulfide containing ash-forming impurities or materials verified by contacting an aqueous mixture of such polymer with molecular oxygen and a finite, but small, effective amount of a mineral acid under conditions sufficient to reduce the ash-forming impurities and concurrently at least partially cure the polymer.

11 Claims, No Drawings

POLYMER TREATMENT

FIELD OF INVENTION

This invention relates to improving the characteristics of arylene sulfide polymer compositions. In accordance with another aspect, this invention relates to the purification of arylene sulfide polymers containing ash-forming impurities and to the curing of such polymers. In accordance with another aspect, this invention relates to a process for the reduction of ash-forming impurities contained in arylene sulfide polymers and concurrently at least partially curing the polymer during de-ashing of the polymer. In accordance with another aspect, this invention relates to the use of a cure accelerator that can be used during the heat treatment of polymers to reduce ash-forming impurities present in the polymer composition. In accordance with a further aspect, this invention relates to a process for simultaneously curing and de-ashing arylene sulfide polymers by carrying out the simultaneous curing and de-ashing in an aqueous solution containing a mineral acid.

BACKGROUND OF THE INVENTION

In applications such as in the production of fibers and films from arylene sulfide polymers, it is desirable that the amount of ash-forming impurities in the arylene sulfide polymer be as low as possible and in many instances below about 1 wt. % in order to meet product (customer) specification. Various procedures have been utilized to purify arylene sulfide polymers containing ash-forming impurities or materials. In addition, arylene sulfide polymers ranging in consistency from viscous liquids to crystalline solids are known. While such polymers exhibit desirable properties for many applications such as molding compositions, the unmodified polymers normally possess a relatively high melt flow, e.g. above 4000 which inhibits their use. It has now been discovered that arylene sulfide polymers can be treated in a manner such that the polymers are essentially freed of ash-forming materials and concurrently or simultaneously cured to a higher molecular weight product exhibiting reduced melt flow.

Accordingly, an object of this invention is to provide a process for improving the properties of arylene sulfide polymers.

A further object of this invention is to simultaneously cure and de-ash arylene sulfide polymers.

Another object of this invention is to carry out simultaneous curing and de-ashing of arylene sulfide polymers in an aqueous solution.

A further object of this invention is to provide arylene sulfide polymers with increased utility by reducing the ash-forming impurities present in the polymers and producing a polymer of reduced melt flow.

Other objects, aspects, and several advantages of the invention will be apparent to those skilled in the art upon the study of the specification and the appended claims.

SUMMARY OF THE INVENTION

Broadly according to the invention, the amount of ash-forming impurities contained in arylene sulfide polymers is reduced by heating the polymer in an aqueous medium in the presence of a small effective amount of a mineral acid and an oxygen containing gas under conditions of temperature and time sufficient to reduce the amount of ash-forming impurities and simultaneously effect at least partial cure of the polymer and reduce the melt flow thereof.

Accordingly, arylene sulfide polymers such as polyphenylene sulfide are substantially reduced in and essentially freed of alkali metal halides and ash-forming impurities to meet product specifications and concurrently cured to higher molecular weight polymers by contacting raw polymer, water, a finite small effective amount of a mineral acid, and molecular oxygen at an elevated temperature and pressure for a period of time sufficient to appreciably reduce the amount of ash-forming impurities and effect at least partial cure of the polymer and substanitally reduce the melt flow thereof in relationship to the starting polymer material.

As can be seen from the specific working examples to be described hereinbelow, the rate of cure of the arylene sulfide polymer can be significantly increased by carrying out the de-ashing and curing in the presence of a finite small effective amount of a mineral acid, preferably sulfuric acid.

DESCRIPTION OF THE PREFERRED EMBODIMENTS

Arylene sulfide polymers which can be employed in the process of this invention include arylene sulfide polymer generally which contain ash-forming impurities as specified above and which have a melt flow prior to curing of at least about 1,000 and generally within the range of about 3,000 to about 15,000, and higher (determined by the method of ASTM D 1238-70, modified to a temperature of 316° C. using a 5-kg weight, the value being expressed as g/10 min.). Thus, the arylene sulfide polymers can be linear, branched, or lightly crosslinked. Although the method by which the polymers of this description are produced is not critical, preferably the polymer employed in the process is prepared by use of polyhalo aromatic compounds, alkali metal sulfides, and organic amides. For example, the arylene sulfide polymer for use in this invention can be produced by the method of U.S. Pat. No. 3,354,129. Alternatively, the polymer employed is prepared by use of a p-dihalobenzene, an alkali metal sulfide, an organic amide, and an alkali metal carboxylate, as in U.S. Pat. No. 3,919,177, optionally together with an alkali metal hydroxide such as sodium hydroxide, e.g., in an amount up to about 0.8 mole of alkali metal hydroxide per mole of alkali metal sulfide and/or a polyhalo aromatic compound as 1,2,4-trichlorobenzene, e.g., in an amount up to about 0.6 part by weight per 100 parts by weight p-dihalobenzene. If desired, a lithium halide such as lithium chloride can be used instead of the alkali metal carboxylate to produce the polymer. If desired, water which can be present with the reactants can be removed by distillation prior to the polymerization reaction.

It is to be understood that the process of this invention can be carried out in a number of ways. In one mode of operation, the reaction mass comprising particulate polymer, alkali metal halide, and organic amide can be subjected to suitable separation techniques to recover polymer freed, as much as possible, of organic amide, unreacted reactants, and alkali metal halide. For example, the polymer can be recovered from the reaction slurry and then combined with water to extract ash-forming materials. The amount of impurities (ash) remaining from this operation prior to treatment, according to the invention, can range from about 0.5 to about 1 wt. %, and higher.

In accordance with the invention, phenylene sulfide polymer containing ash-forming materials is contacted in an aqueous slurry with a finite, but small effective, amount of a mineral acid, and an oxygen-containing gas at an elevated temperature and pressure for a period of time sufficient to substantially reduce the amount of ash-forming materials in the polymer and, at the same time, at least partially cure the polymer product and reduce the melt flow thereof.

Further in accordance with the invention, it has been found that the rate of curing of arylene sulfide polymers in an aqueous solution can be increased by carrying out the curing operation in the presence of a finite, but small, effective amount of a mineral acid. Suitable mineral acids include sulfuric acid, hydrochloric acid, nitric acid, phosphoric acid and the like. Sulfuric acid is presently preferred.

The amount of mineral acid employed, according to the invention, will be a small, effective amount sufficient to accelerate curing of the polymer but insufficient to cause polymer degradation. In general, the amount of mineral acid employed will range from about 0.1 to about 5 php (parts per 100 polymer) with a preferred range being about 0.1 to about 1 php.

The heating to effect de-ashing and concurrent curing can be carried out at an elevated temperature which is below the melting point of the polymer for a period of time sufficient to effect de-ashing and at least partial curing. Normally, the contacting will be at least about 150° C. but will be below the melting point of the polymer. Ordinarily, the contacting temperatures will be in the range of about 200° C. to about 290° C.

The time for treatment or contacting can vary greatly depending, in part, on the temperature and the nature of the arylene sulfide polymer. It generally will be within the range of about 5 minutes to about 10 hours, preferably about 30 minutes to about 5 hours. For example, with a given slurry and to effect a given reduction in melt flow, the contact time decreases with increasing temperature. The pressure should be sufficient to maintain liquid phase conditions. Repeated treatments can be employed if desired, and the process can be carried out in several stages, if desired.

As indicated above, the heating is carried out in the presence of an oxygen-containing gaseous oxidizing atmosphere such as air, pure oxygen, and the like. The oxidizing gas rate, with respect to contacting of the particulate polymer in the slurry, will vary appreciably depending upon the type of apparatus employed for carrying out the oxidative curing and de-ashing. If desired, the oxygen-containing gas can be heated prior to contacting with the polymer slurry. The amount of oxygen present can vary widely but generally ranges from about 20 to about 80 psi.

The polymer/water slurry can consist of about 5 to about 60 wt. % polymer and more preferably from about 10 to about 30 wt. % polymer to provide convenient handling and separation factors.

After the purification and drying steps, the resin is left in the form of a finely divided, free flowing, white powder having a particle size range averaging from about 5 to about 1,500 micrometers. In the processes of this invention it is preferred to utilize such finely divided resin to expedite contact with the water and treating agents.

The process of this invention can be conducted batchwise or continuously.

The heating, according to the invention, can be carried out in conventional equipment. A convenient method for carrying out the process is to contact the polymer slurry with the oxygen-containing gaseous medium in an enclosed tank provided with agitation. The contacting can be carried out in a single vessel or with a plurality of vessels. The polymer can be separated from the slurry after contacting by suitable techniques including pressure reduction to atmospheric, filtrations, and the like, and allowing the polymer to be subsequently dried for further use as desired.

The following examples are intended to illustrate the compositions and process of the invention.

EXAMPLE I

All curing experiments were carried out with 600 grams of commercially produced Ryton® "FS-1" polyphenylene sulfide (PPS) and 2425 milliliters of deionized water in a stirred 2-gallon stainless steel reactor. "FS-1" PPS had a melt flow of 4100 grams/10 minutes, determined at 316° C. according to a modified ASTM D1238 procedure using a total load (including the weight of the piston) of 5.0 Kg after holding the polmer in the melt for 5 minutes and an ash content of 0.50 wt. %.

Polymer, water, and optionally, acids were heated in the reactor with slow stirring (75 r.p.m.) until steam came out of the take-off valve thus removing any gases from the system. The take-off valve was closed and blocked, and the system was heated to the desired temperature of 238° C. with faster stirring (1000 r.p.m.). Oxygen was added to give a desired pressure of about 50 psig above the autogenous reactor pressure. Additional oxygen was added at 15 minute intervals to maintain an essentially constant pressure during the oxygen—consuming PPS curing process. The total reactor pressure including the pressure of added oxygen ranged generally from 500 psig to 550 psig at 238° C.

In experimental runs employing sulfuric acid, the aqueous slurry contained 2.5 to 10.0 grams of concentrated $H_2SO_4$ in 2425 ml of water thus resulting in solution concentrations ranging from 0.0105 to 0.042 moles/liter. In control runs either no acid was added or 10.0 grams of glacial acetic acid were employed. Samples of the slurry were obtained at hourly intervals by opening a sample valve and filling a 250 ml, stainless steel sample bomb cooled in ice water.

At the end of the curing test, the reactor was cooled rapidly with water in an internal cooling coil, and the oxygen was released when the system was near room temperature. The polymer was collected on a suction filter, washed repeatedly with hot deionized water, and dried in a vacuum oven at about 90° C.

EXAMPLE II

In this example the effects of sulfuric acid on the cure rate of PPS (flow rate: 4100 g/10 minutes) containing 0.50 weight percent ash in an aqueous slurry at 238° C. and an autogenous steam pressure (before oxygen addition) of 480–490 psig according to the procedure of Example I are described. Results are summarized in Table I.

TABLE I

| Run | Added Acid | Amount of Acid, php[a] | pH | Oxygen Psig | Melt Flow[b] after hours of curing: 1 Hour | 2 Hours | 3 Hours | 4 Hours[d] | Ash[e] Weight % |
|---|---|---|---|---|---|---|---|---|---|
| 1 (Control) | None | — | 7.0[c] | 50 | 1923 | 329 | 3.8 | 74 | 0.25 |
| 2 (Control) | Acetic Acid | 1.67 | 2.6[c] | 50 | 1296 | — | — | 335 | 0.16 |
| 3 (Invention) | Sulfuric Acid | 0.42 | 1.7[c] | 50 | 661 | 64 | 220 | 429 | 0.27 |
| 4 (Invention) | Sulfuric Acid | 0.83 | 1.4[c] | 50 | 644 | 245 | 201 | 290 | 0.71[f] |
| 5 (Invention) | Sulfuric Acid | 1.67 | 1.1[c] | 50 | 451 | 276 | 308 | 281 | 2.73[f] |

[a]parts by weight per 100 parts by weight of polymer
[b]determined according to the procedure described in Example I
[c]calculated; before heating
[d]reactor sample, some material had not been slurried because it stuck to the reactor top
[e]ash content determined after 4 hours of slurry curing
[f]it is believed that the higher ash content is caused by bonding of metal ions (from the steel reactor) to polar end groups on the polymer having undergone chain scission.

Data in Table I show that PPS cured faster in the presence of sulfuric acid, thus giving lower melt flow, than PPS heated in neutral water or in the presence of acetic acid. After 2 hours of curing, the melt flow of PPS cured in the presence of $H_2SO_4$ was considerably lower than PPS cured in neutral water. Curing for more than 2 hours, in the presence of $H_2SO_4$ apparently resulted in chain scission as the predominant effect thus causing higher melt flows of the polymer. Curing in the presence of 0.42 php of sulfuric acid for about 2 hours (Run 3) appears to result in the highest polymer cure rate and is considered to preferred mode of operation at 238° C./50 psig oxygen.

EXAMPLE III

In this example the effect of the oxygen pressure on the cure rate of PPS at 248° C. (invention runs 6–18) is described. Control run 9 without sulfuric acid was carried out at 238° C. The curing was carried out with 2.5 grams of sulfuric acid (0.42 php), 600 grams of PPS (melt flow: 4100 g/10 minutes) and 2425 ml of deionized water in accordance with the procedure of Example I, except that the slurry temperature was 248° C., the autogenous steam pressure ranged from 590 psig to 630 psig, and the final stirrer speed was 1250 r.p.m. Results are summarized in Table II.

TABLE II

| Run | Oxygen psi | Melt Flow After Hours of Curing: 1 hour | 2 hours | 3 hours | 4 hours | Ash Content weight % |
|---|---|---|---|---|---|---|
| 6 (invention) | 30 | 866 | 375 | 284 | 562 | 0.17 |
| 7 (invention) | 40 | 628 | 109 | 108 | 569 | 0.31 |
| 8 (invention) | 50 | 414 | 72 | 502 | 575 | 0.35 |
| 9 (Control) | 30 | 1640 | 866 | 454 | 372 | 0.20 |

Data in Table II indicate that curing of PPS in an aqueous slurry containing 0.42 php of sulfuric acid at 248° C. and 50 psi of oxygen results in the lowest melt flow thus indicating highest cure rate. Extended heating at these conditions resulted in an increase in melt flow thus indicating chain scission as the predominant effect.

I claim:

1. A process for reducing the ash content and concurrently decreasing the melt flow of raw arylene sulfide polymers which comprises heating said arylene sulfide polymer in the presence of water, a finite, but small effective, amount sufficient to accelerate curing of the polymer but insufficient to cause polymer degradation of a mineral acid, and an oxygen-containing gas at an elevated temperature below the melting point of the polymer.

2. A process according to claim 1 wherein said temperature is at least about 150° C. and said polymer has a melt flow of at least about 1,000, and is heated in an aqueous slurry containing from about 5 to about 60 weight percent polymer.

3. A process according to claim 1 wherein said temperature ranges from about 200° to about 290° C.

4. A process according to claim 1 wherein said polymer is polyphenylene sulfide and said acid is sulfuric acid.

5. A process according to claim 4 wherein said oxygen-containing gas is air and said polymer is heated in an aqueous slurry containing from about 5 to about 60 weight percent polymer and from about 0.1 to about 5 php of acid.

6. A process according to claim 1 wherein said amount of acid ranges from about 0.1 to about 5 php and said heating is carried out at a temperature ranging from about 200° to 290° C. and is maintained for a period of time of about 0.2 to about 10 hours utilizing an oxygen pressure of about 20 to about 80 psi.

7. A process according to claim 1 which comprises heating an aqueous slurry containing from about 10 to about 30 weight percent of particulate purified raw arylene sulfide polymer substantially freed of organic amide and alkali metal sulfide containing residual ash-forming impurities or materials and from about 0.1 to about 1.0 php of said acid.

8. A process according to claim 7 wherein said polymer is polyphenylene sulfide and said acid is sulfuric acid.

9. A process according to claim 1 comprising the steps of:

(a) producing a slurry of raw arylene sulfide polymer having a melt flow of at least about 1,000 containing ash-forming impurities in water at a temperature above about 150° C. but below the melting point of the polymer, (b) contacting the slurry of (a) under oxidizing conditions with an oxygen-containing gas and a finite, but small effective, amount of about 0.1 to about 5 php of a mineral acid for a period of time sufficient to at least partially cure and reduce the melt flow of the polymer and at the same time reduce the ash-forming impurities in the polymer, and (c) separating from said slurry at least partially cured polymer substantially freed of ash-forming materials and impurities.

10. A process according to claim 9 wherein said polymer is polyphenylene sulfide, said acid is sulfuric acid, and said contacting temperature is in the range of about 200° to about 290° C. and said oxygen-containing gas is air.

11. A process according to claim 10 wherein said aqueous slurry forming in (a) contains from about 10 to about 30 weight percent polymer and the amount of acid present in (b) ranges from about 0.1 to about 1 php.

* * * * *